United States Patent
Huling et al.

(10) Patent No.: US 11,801,904 B2
(45) Date of Patent: Oct. 31, 2023

(54) TECHNIQUES INVOLVING A MODULAR VEHICLE BELLY ARMOR KIT

(71) Applicant: Textron Systems Corporation, Hunt Valley, MD (US)

(72) Inventors: Wyatt Coleman Huling, Slidell, LA (US); Giovanni Eduardo Sequeira, Abita Springs, LA (US); Edward Lawrence Broom, Pearl River, LA (US)

(73) Assignee: Textron Systems Corporation, Hunt Valley, MD (US)

( * ) Notice: Subject to any disclaimer, the term of this patent is extended or adjusted under 35 U.S.C. 154(b) by 59 days.

(21) Appl. No.: 17/527,405

(22) Filed: Nov. 16, 2021

(65) Prior Publication Data

US 2023/0150581 A1 May 18, 2023

(51) Int. Cl.
| | |
|---|---|
| *B62D 25/20* | (2006.01) |
| *B60F 3/00* | (2006.01) |
| *F41H 7/04* | (2006.01) |
| *B62D 65/16* | (2006.01) |

(52) U.S. Cl.
CPC ........ *B62D 25/2072* (2013.01); *B60F 3/0038* (2013.01); *B62D 65/16* (2013.01); *F41H 7/042* (2013.01)

(58) Field of Classification Search
CPC ....... B62D 25/2072; F41H 7/042; F41H 7/02; F41H 7/04; F41H 7/048; B60F 3/0038
See application file for complete search history.

(56) References Cited

U.S. PATENT DOCUMENTS

| | | |
|---|---|---|
| 7,997,182 B1 | 8/2011 | Cox |
| 8,418,594 B1 * | 4/2013 | Dunne, Jr. .............. F41H 7/042 89/929 |
| 8,499,677 B2 | 8/2013 | Lee |
| 8,596,183 B2 | 12/2013 | Coltrane |
| 8,770,086 B2 | 7/2014 | Enck |
| 8,826,796 B1 * | 9/2014 | Gonzalez ................ F41H 7/042 89/929 |
| 8,833,230 B2 | 9/2014 | Ho |
| 8,955,859 B1 | 2/2015 | Richmond et al. |

(Continued)

FOREIGN PATENT DOCUMENTS

| | | | |
|---|---|---|---|
| WO | 2014184470 | 11/2014 | |
| WO | WO 2014/184470 | * 11/2014 | ............. F41H 7/042 |
| WO | 2017030461 | 2/2017 | |

OTHER PUBLICATIONS

PCT/US2022/047663; Notification of Transmittal of the International Search Report and the Written Opinion of the International Searching Authority, or the Declaration; dated Jan. 31, 2023; 12 pages.

*Primary Examiner* — Gregory A Blankenship
(74) *Attorney, Agent, or Firm* — BainwoodHuang

(57) ABSTRACT

Techniques are directed to a modular vehicle belly armor kit, as well as systems and methods which utilize such a kit. The kit includes a bottom plate, a top plate, and a plurality of wall sections connecting with the bottom plate and the top plate to form an armor structure that protects a belly portion of the vehicle. After the modular vehicle belly armor kit is positioned underneath a vehicle, the bottom plate may be placed in contact with the vehicle. After the bottom plate is placed in contact with the vehicle, the bottom plate may be fastened to vehicle.

20 Claims, 10 Drawing Sheets

(56) References Cited

U.S. PATENT DOCUMENTS

| | | | |
|---|---|---|---|
| 8,998,299 B2 | 4/2015 | Shmargad | |
| 9,016,186 B2 | 4/2015 | Asaf et al. | |
| 9,027,458 B2 | 5/2015 | Akavuti et al. | |
| 9,038,523 B2 | 5/2015 | Rasico et al. | |
| 9,452,784 B2 | 9/2016 | Batt | |
| 9,562,750 B2 | 2/2017 | Rasico et al. | |
| 9,649,901 B2 | 5/2017 | Bachmann et al. | |
| 9,696,120 B1* | 7/2017 | Moser | F41H 5/0492 |
| 9,989,333 B2 | 6/2018 | Sumi et al. | |
| 10,323,909 B2 | 6/2019 | Carton et al. | |
| 10,401,128 B2 | 9/2019 | Mick et al. | |
| 10,641,584 B2 | 5/2020 | Bocchieri et al. | |
| 11,313,652 B1* | 4/2022 | Burguess | F41H 7/044 |
| 2011/0017054 A1 | 1/2011 | Naroditsky et al. | |
| 2012/0097019 A1* | 4/2012 | Sherbeck | F41H 7/044 89/36.02 |
| 2012/0103177 A1* | 5/2012 | Coltrane | F41H 7/02 89/937 |
| 2012/0186428 A1* | 7/2012 | Peer | F41H 7/042 89/929 |
| 2012/0192706 A1* | 8/2012 | Gonzalez | F41H 7/042 89/36.02 |
| 2012/0210861 A1* | 8/2012 | Tobie | F41H 5/007 89/937 |
| 2012/0255428 A1* | 10/2012 | Allor | F41H 7/042 89/36.02 |
| 2013/0036899 A1* | 2/2013 | Tucker | F41H 7/042 89/36.02 |
| 2013/0249244 A1* | 9/2013 | Cassaday | B62D 25/2036 296/187.03 |
| 2014/0150622 A1* | 6/2014 | Wen | B23D 45/10 83/838 |
| 2014/0310938 A1* | 10/2014 | Parida | F41H 5/0442 29/428 |
| 2014/0318357 A1* | 10/2014 | Parida | F41H 7/042 89/36.02 |
| 2014/0318359 A1* | 10/2014 | Asaf | F41H 5/007 89/36.08 |
| 2016/0047631 A1* | 2/2016 | Berman | F41H 7/044 296/187.07 |
| 2017/0321995 A1* | 11/2017 | Sumi | F41H 5/04 |
| 2017/0328685 A1* | 11/2017 | Bocchieri | B62D 21/15 |
| 2018/0080743 A1 | 3/2018 | Mick et al. | |
| 2019/0084626 A1* | 3/2019 | Sumi | F16F 7/123 |
| 2020/0182592 A1* | 6/2020 | Sloman | F41H 7/042 |
| 2022/0194494 A1 | 6/2022 | Tripp et al. | |
| 2023/0150581 A1* | 5/2023 | Huling | B62D 25/2072 296/187.08 |

\* cited by examiner

TECHNIQUES INVOLVING A MODULAR VEHICLE BELLY ARMOR KIT

BACKGROUND

A typical land vehicle includes a frame, as well as an engine and a body which are supported by the frame. The engine provides drive to move the vehicle over land. The body may include a crew cabin to hold a crew.

Some land vehicles are used in unsafe militarized areas which target the bottom sides of vehicles. In one conventional land vehicle, the crew cabin includes an extra thick floor panel. In another conventional land vehicle, the vehicle's underbody is equipped with an energy absorption device having mechanically operating cylinders to provide an energy absorbing dampening effect to the vehicle's underbody.

SUMMARY

Unfortunately, there are deficiencies to the above-described conventional land vehicles. For example, with regard to the conventional land vehicle having the extra thick floor panel, the extra thick floor panel does not perform well against a blast or explosive event directly underneath the vehicle. That is, since the floor panel lays flat (i.e., horizontal to the ground), energy from such an explosive event is not deflected away from the crew cabin. Instead, the floor of the crew cabin is exposed to the full energy of the explosive event. Furthermore, the extra thick floor panel reduces the buoyancy characteristics of the conventional land vehicle thus hindering the vehicle's ability to operate in certain situations such as participating in amphibious missions.

Additionally, with regard to the conventional land vehicle that uses an energy absorption device having mechanically operating cylinders, the complexity of the energy absorption device (e.g., the large number of different components, how they are arranged and connected, how they operate, etc.) increases the likelihood of malfunction and/or failure over time. Moreover, the cylinders and related connecting parts may actually promote fragmentation thus making the conventional land vehicle less safe.

In contrast to the above-described conventional land vehicles, improved techniques are directed to making and/or using a modular armor kit to protect the underbelly of a vehicle. Such a kit includes a bottom plate, a top plate, and wall sections that form an armor structure that attaches to the vehicle. The bottom plate may have a convex profile (e.g., a V-shaped cross-section) to enable the armor structure to deflect projectiles out and away from the vehicle's centerline. In some arrangements, the armor structure includes a set of cavities (e.g., filled with air and/or other buoyant material) to reduce dust/debris buildup buoyancy and make the vehicle better suited for certain applications such as amphibious missions.

One embodiment is directed to a modular vehicle belly armor kit for protecting a vehicle. The modular vehicle belly armor kit includes a bottom plate, a top plate, and a plurality of wall sections connecting with the bottom plate and the top plate to form an armor structure that protects a vehicle belly of the vehicle. Such a kit is well suited for protecting a vehicle from explosive events that can be targeted at the vehicle's bottom side.

Another embodiment is directed to a vehicle which includes a vehicle body, and a propulsion system coupled with the vehicle body. The propulsion system is constructed and arranged to move the vehicle body within an environment. The vehicle further includes a modular vehicle belly armor kit constructed and arranged to fasten to the vehicle body. The modular vehicle belly armor kit includes:
(A) a bottom plate,
(B) a top plate, and
(C) a plurality of wall sections connecting with the bottom plate and the top plate to form an armor structure that protects a belly portion of the vehicle.

In some arrangements, the vehicle body is constructed and arranged to travel amphibiously on water and land. Additionally, the armor structure is constructed and arranged to provide buoyancy to the vehicle body.

Yet another embodiment is directed to a method of protecting a vehicle. The method includes:
(A) positioning a modular vehicle belly armor kit underneath a vehicle, the modular vehicle belly armor kit including:
  a bottom plate,
  a top plate, and
  a plurality of wall sections connecting with the bottom plate and the top plate to form an armor structure that protects a belly portion of the vehicle;
(B) after the modular vehicle belly armor kit is positioned underneath the vehicle, placing the bottom plate in contact with the vehicle; and
(C) after the bottom plate is placed in contact with the vehicle, fastening the bottom plate to the vehicle.

In some arrangements, the bottom plate defines a set of bends that provides the armor structure with a convex shape. Additionally, the top plate defines a plane (e.g., a flat surface that may sit flush against the underside of the vehicle), a left edge, and a right edge. Furthermore, the left edge and right edge defined by the top plate connect with the bottom plate (e.g., via welds).

In some arrangements, the set of bends defined by the bottom plate includes a centerline bend that provides the bottom plate with a V-shaped cross-section. Such an arrangement enables creation of a homogenous bottom face positioned in the direction of a potential blast or explosive threats under the vehicle.

In some arrangements, the set of bends defined by the bottom plate further includes outer bends that separate the bottom plate into a central section and outermost sections. In some arrangements, the centerline bend and the outer bends are parallel to each other.

In some arrangements, the outer bends include a left outer bend and a right outer bend. Additionally, the left edge defined by the top plate attaches to the bottom plate adjacent the left outer bend. Furthermore, the right edge defined by the top plate attaches to the bottom plate adjacent the right outer bend.

In some arrangements, the outermost sections include a left outer segment constructed and arranged to mount to a left side of the vehicle, and a right outer segment constructed and arranged to mount to a right side of the vehicle.

In some arrangements, the left outer segment and the right outer segment extend upwardly relative to the plane defined by the top plate to position the plane defined by the top plate horizontally when the left outer segment is mounted to the left side of the vehicle and the right outer segment is mounted to the right side of the vehicle. Such an arrangement allows for small adjustments to the outer flange angles that enable various vehicle underbelly shapes to utilize the kit without compromising performance of the kit for a blast/explosive event.

In some arrangements, the left outer segment defines a left row of elongated apertures (or voids) and the right outer segment defines a right row of elongated apertures (or voids) to enable movement between the vehicle and the modular vehicle belly armor kit. Such an arrangement provides installation flexibility when using mounting hardware to attach the kit to a vehicle (e.g., the apertures allow for discrepancies between the kit and the vehicle due to imprecise plate position, deformities, etc.). Furthermore, such an arrangement may increase protection performance by allowing for movement in the kit as opposed to a rigid hard mounted structure.

In some arrangements, the top plate further defines a front edge and a back edge. Additionally, the plurality of wall sections includes a front wall section that connects with the bottom plate and the front edge defined by the top plate, and a back wall section that connects with the bottom plate and the back edge defined by the top plate.

In some arrangements, the plurality of wall sections further includes a set of interior wall sections that connects with the bottom plate and the top plate. The set of interior wall sections is disposed between the front wall section and the back wall section. In some arrangements, the top plate further defines a plurality of notches.

Additionally, each wall section of the plurality of wall sections defines a respective set of tabs that interlocks with a respective set of notches of the plurality of notches defined by the top plate. Such an arrangement adds rigidity to the bottom plate enabling the bottom plate to effectively deflect away projectiles.

In some arrangements, the front wall section, the back wall section, and the set of interior wall sections form a set of internal cavities to provide buoyancy to the vehicle.

In some arrangements, the modular vehicle belly armor kit further includes foam material or the like disposed within at least some of the set of internal cavities. Such material improves buoyancy, prevents collection of dust/debris, and increases the protective characteristics of the kit against blast/explosive events.

In some arrangements, the bottom plate further defines a set of access openings. Additionally, the modular vehicle belly armor kit further includes a set of cover plates that covers the set of accessing openings defined by the bottom plate.

In some arrangements, the bottom plate further defines a set of coamings surrounding the set of access openings. Additionally, the set of cover plates is constructed and arranged to attach within the set of coamings defined by the bottom plate. Such a set of coamings provides proper cover plate positioning, and may eliminate or reduce the need for mounting hardware that would be susceptible to shearing due to collisions with debris from vehicle operating environments.

Other embodiments are directed to systems, crafts, apparatus, devices, assemblies, and so on. Some embodiments are directed to various methods, systems, and componentry which are involved in making and/or utilizing a modular vehicle belly armor kit.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques involve making and/or using a modular armor kit to protect the underbelly of a vehicle. Such a kit includes a bottom plate, a top plate, and wall sections that form an armor structure that attaches to the vehicle. The bottom plate may have a convex profile (e.g., a V-shaped cross-section) to enable the armor structure to deflect projectiles out and away from the vehicle's centerline. In some arrangements, the armor structure includes a set of cavities (e.g., filled with air and/or lightweight material) to reduce dust/debris buildup as well as improve buoyancy thus making the vehicle better suited for certain applications such as amphibious missions.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
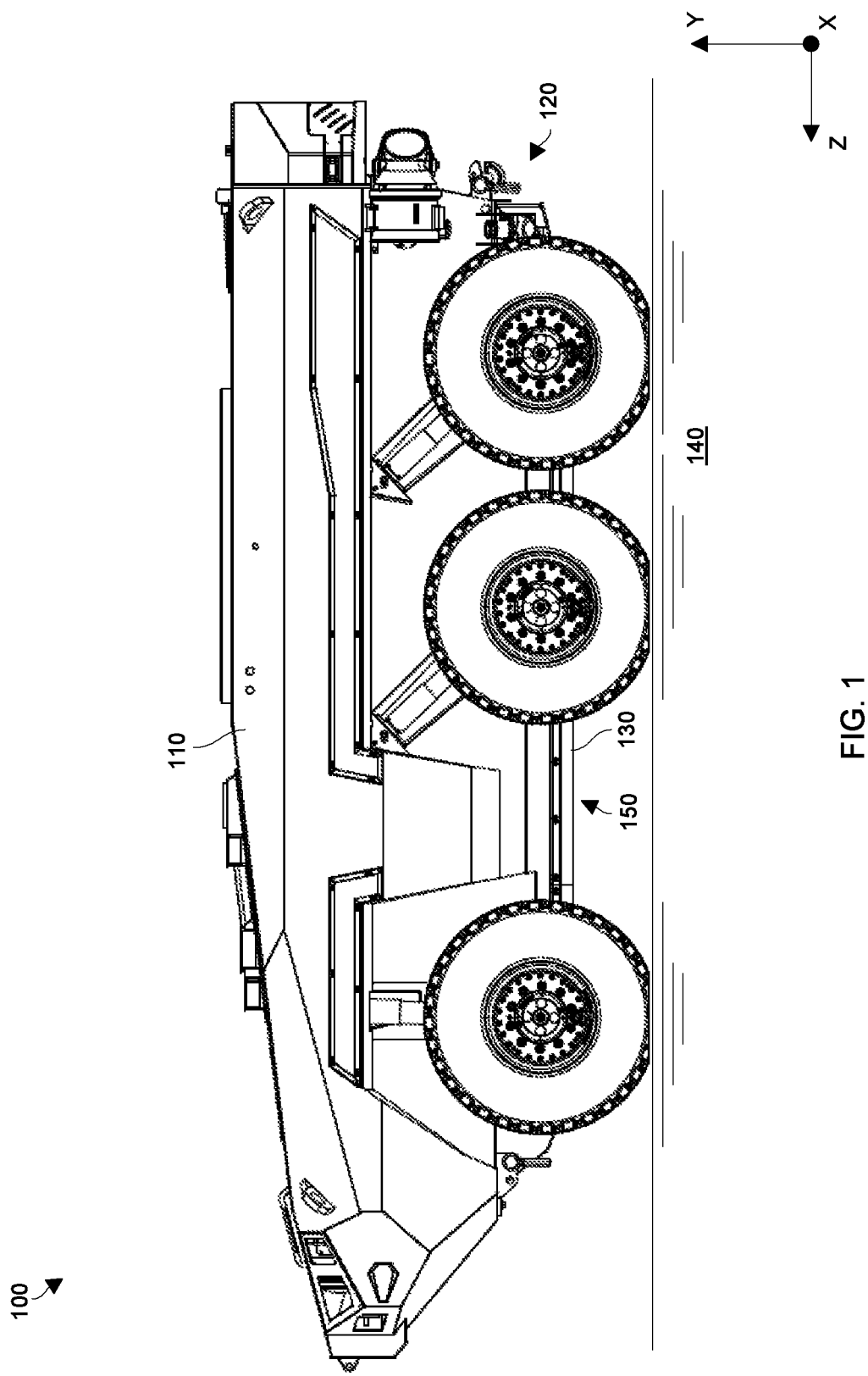
FIG. 1 is a side view of a vehicle which utilizes a modular vehicle belly armor kit in accordance with certain embodiments.

FIG. 1 shows a vehicle 100 which utilizes a modular vehicle belly armor kit in accordance with certain embodiments. The vehicle 100 includes a vehicle body 110, a propulsion system 120, and a modular vehicle belly armor kit 130.

The vehicle body 110 refers to all or portions of the vehicle chassis, suspension, frame/structure, cabin area(s), cargo area(s), combinations thereof, etc. The vehicle body 110 is constructed and arranged to, among other things, carry a set of loads. Such loads may include certain vehicle systems, fuel, passengers, cargo, specialized equipment, combinations thereof, and so on.

The propulsion system 120 couples with the vehicle body 110 and is constructed and arranged to move the vehicle body among and through a variety of environments 140. Suitable environments 140 include paved roads and areas with similar hard/flat surfaces, desert areas, rough/rocky terrain, forests, jungles, river and stream areas, marshes, beaches, icy and snowy areas, combinations thereof, and so on.

The modular vehicle belly armor kit 130 is constructed and arranged to fasten to the vehicle body 110, and protect a belly portion 150 of the vehicle 100. The belly portion 150 may include, among other things, the drive train, one or more axles, one or more fuel tanks, other portions of the propulsion system 120, a crew compartment or cabin, a storage area, specialized equipment, combinations thereof, and so on.

In some arrangements, the modular vehicle belly armor kit 130 is included with and considered part of the vehicle 100 itself. In other arrangements, the modular vehicle belly armor kit 130 is provided as an accessory to a conventional vehicle.

During operation, the modular vehicle belly armor kit 130 provides protection from blast/explosive forces targeted at the bottom of the vehicle 100, damage from rocks, tree stumps, other objects/structures, and so on. For example, objects beneath the vehicle 100 traveling generally in the positive Y-direction would be deflected by the modular vehicle belly armor kit 130 away from the belly portion 150 and outwardly toward the sides.

Additionally, in accordance with certain embodiments, the modular vehicle belly armor kit 130 provides buoyancy. Such a feature enables the vehicle 100 to perform well in certain situations such as amphibious missions.

By way of example only and in accordance with certain embodiments, the vehicle 100 is illustrated as an armored vehicle which is capable of traveling amphibiously on water and land. Along these lines, the modular vehicle belly armor kit 130 provides a set of cavities which improves buoyancy thus making the vehicle 100 well suited for various missions which involve traveling over water, around debris, over rough terrain, and the like. Nevertheless, it should be understood that the modular vehicle belly armor kit 130 is suitable for use on other types of vehicles 100 such as cars, trucks, jeeps, SUVs and other utility vehicles, boats and other water craft, aircraft, trains, and so on. Although certain types of vehicles 100 may use the same or other types of propulsion systems 120 (e.g., wheels, tracks, propellers, fans, jet engines, etc.), the modular vehicle belly armor kit 130 is nevertheless well-suited for protecting the bellies 150 of such vehicles 100. Further details will now be provided with reference to FIGS. 2 through 4.

Figure 2:
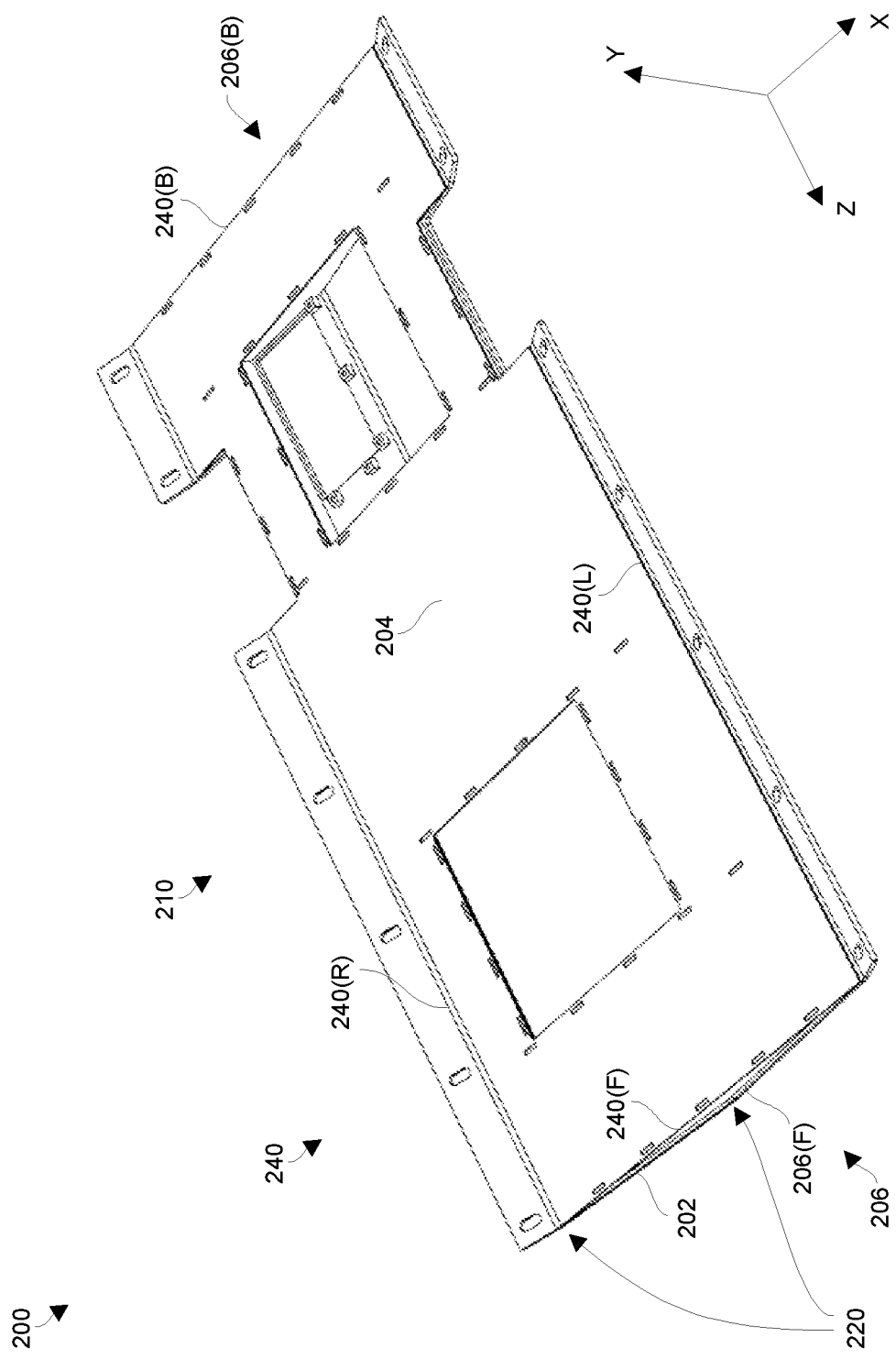
FIG. 2 is a first perspective view of at least a portion of the modular vehicle belly armor kit in accordance with certain embodiments.
Figure 3:
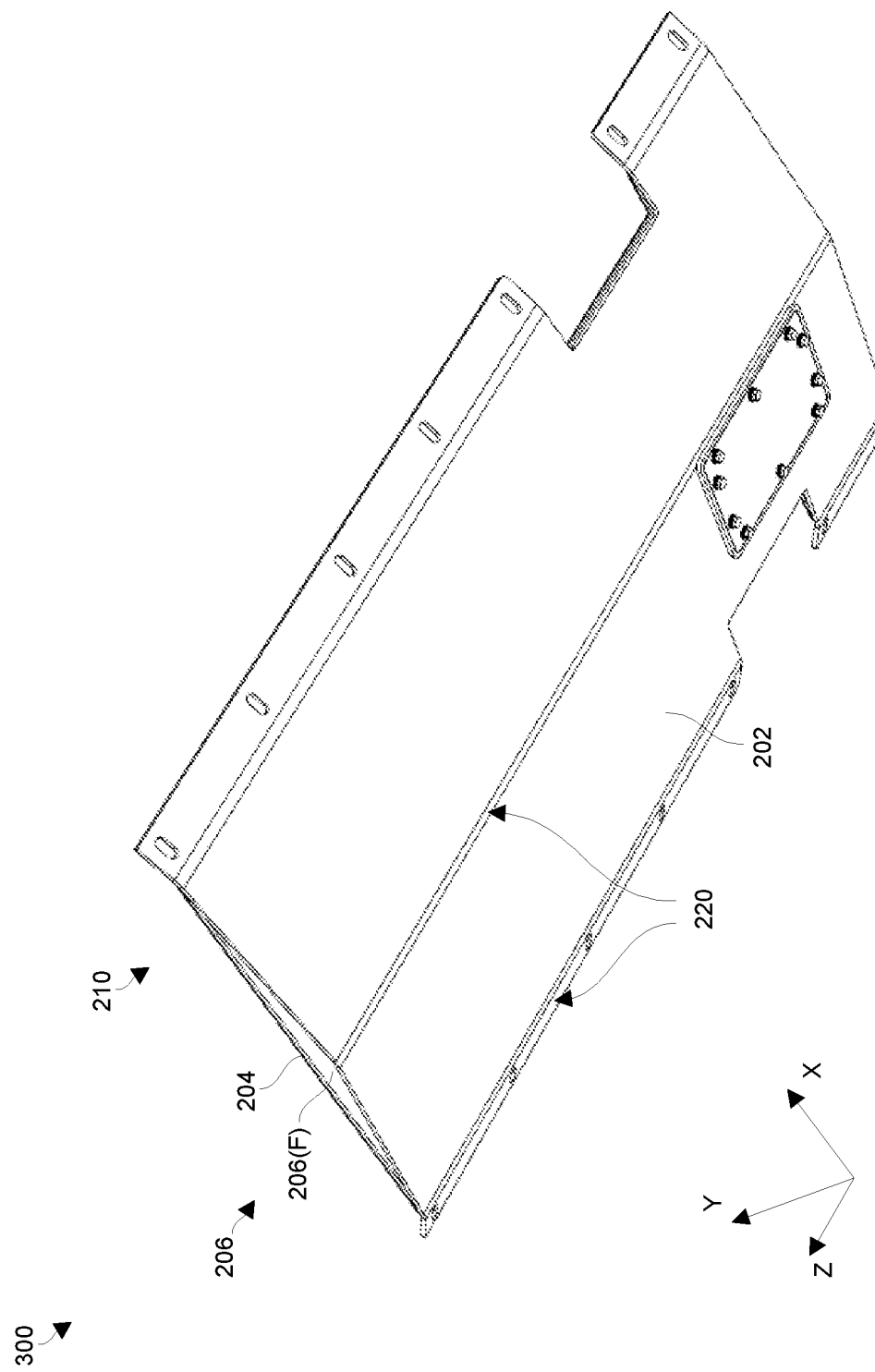
FIG. 3 is a second perspective view of at least a portion of the modular vehicle belly armor kit in accordance with certain embodiments.
Figure 4:
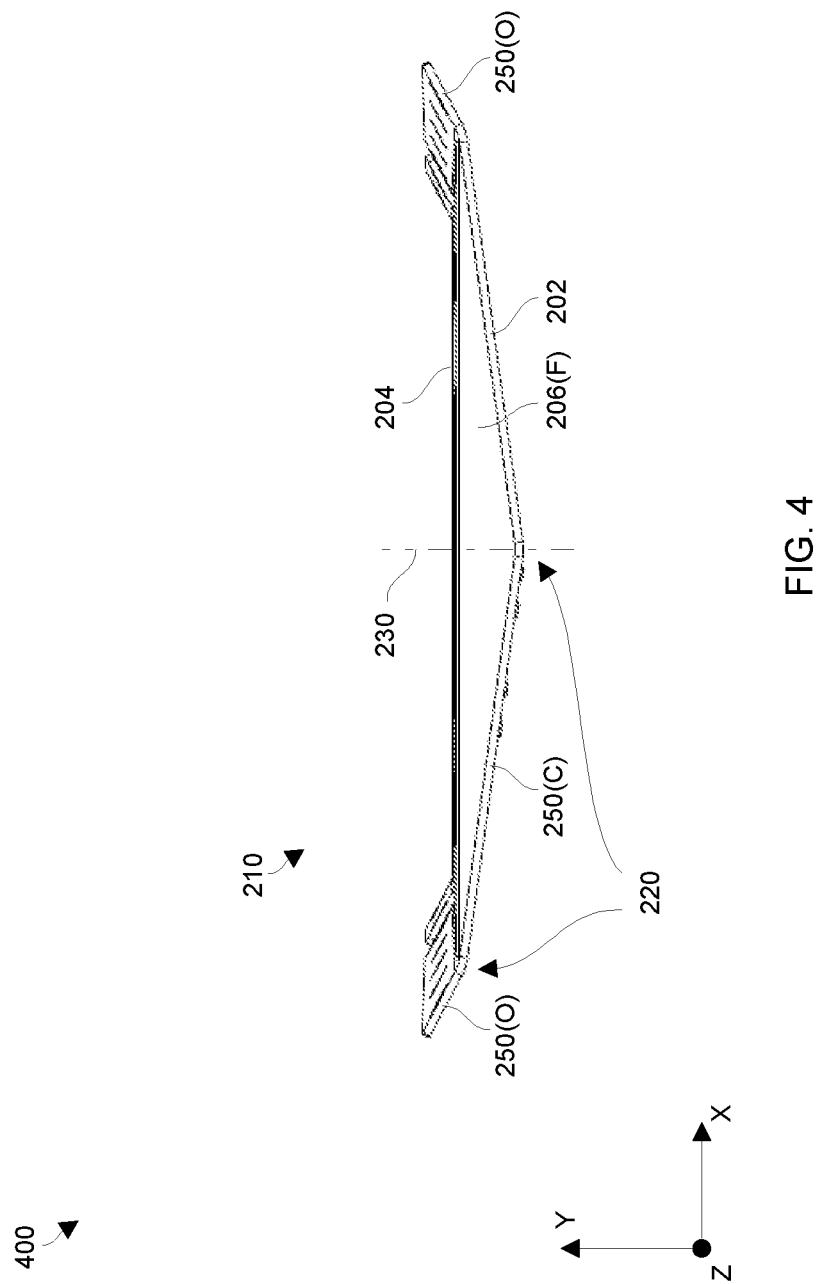
FIG. 4 is a cross-sectional view of at least a portion of the modular vehicle belly armor kit in accordance with certain embodiments.

FIGS. 2 through 4 show particular details of at least a portion of the modular vehicle belly armor kit 130 in accordance with certain embodiments. FIG. 2 is a first perspective view 200 from above. FIG. 3 is a second perspective view 300 from below. FIG. 4 is a cross-sectional view 400 (e.g., looking in the negative Z-direction). As will be explained later on, the modular vehicle belly armor kit 130 may include one or more additional portions such as a front portion to further protect a front section of the vehicle body 110, and a back portion to further protect a back section of the vehicle body 110.

As shown in FIGS. 2 through 4, the modular vehicle belly armor kit 130 includes a bottom plate 202, a top plate 204, and wall sections 206. The wall sections 206 connect with the bottom plate 202 and the top plate 204 to form an armor structure 210 that protects the belly portion 150 of the vehicle 100 (also see FIG. 1). Additionally, the bottom plate 202 and the top plate 204 connect with each other.

As best seen in FIG. 4, the bottom plate 202 defines a set of bends 220 that provides the armor structure 210 with a convex shape in accordance with certain embodiments. In particular, the bottom plate 202 bows outwardly away from the top plate 204 in the negative Y-direction with a bend 220 at the centerline 230 being a portion of the bottom plate 202 that is farthest from the top plate 204 providing the bottom plate 202 with a V-shaped cross-section. Accordingly, when the modular vehicle belly armor kit 130 is installed onto the vehicle body 110 to cover the vehicle's belly 150 (FIG. 1) such that the centerline 230 aligns with the vehicle's centerline, the modular vehicle belly armor kit 130 is able to effectively deflect projectiles, objects, debris, etc. out of and/or away from the vehicle's centerline.

As best seen in FIG. 2, the top plate 204 extends along the X-Z plane and defines a set of edges 240 in accordance with certain embodiments. In particular, a left edge 240(L) and a right edge 240(R) defined by the top plate 204 connect with the bottom plate 202 (e.g., via welded joints). Additionally, a front edge 240(F) connects with a front wall 206(F). Similarly, a back (or rear) edge 240(B) connects with a back (or rear) wall 206(B) (e.g., via a notch-and-groove arrangement). Accordingly, the top plate 204 is capable of sitting flush against and/or parallel to a flat underbelly 150 of the vehicle body 110.

With reference back to FIG. 4, the set of bends 220 defined by the outer plate 202 further include outer bends 220 which are adjacent to where edges 240 of the top plate 204 attach to the bottom plate 202. These outer bends 220 are parallel to the bend 220 at the centerline 230, and separate the bottom plate 202 into a central section 250(C) and outermost sections 250(O). In particular, one of the outermost sections 250(O) is a left outer segment constructed and arranged to mount to a left side of the vehicle body 110 (FIG. 1). Likewise, another of the outermost sections 250(O) is a right outer segment constructed and arranged to mount to a right side of the vehicle body 110.

As best seen in FIG. 4 and in accordance with certain embodiments, the outermost sections 250(O) are not perfectly horizontal. Rather, the left outer segment and the right outer segment extend upwardly relative to the X-Z plane defined by the top plate 204. Such a feature enables the left outer segment and the right outer segment to mount to the sides of the vehicle body 110 (e.g., via hardware).

In some arrangements, the left outer segment defines a left row of elongated apertures and the right outer segment defines a right row of elongated apertures to enable small amounts of movement (e.g., compliance) between the vehicle body 110 and the modular vehicle belly armor kit 130. With such a design, small adjustments to the outer flange angles enable various vehicle underbelly shapes to utilize the kit 130 without compromising performance of the kit 130 for a blast/explosive event.

Figure 5:
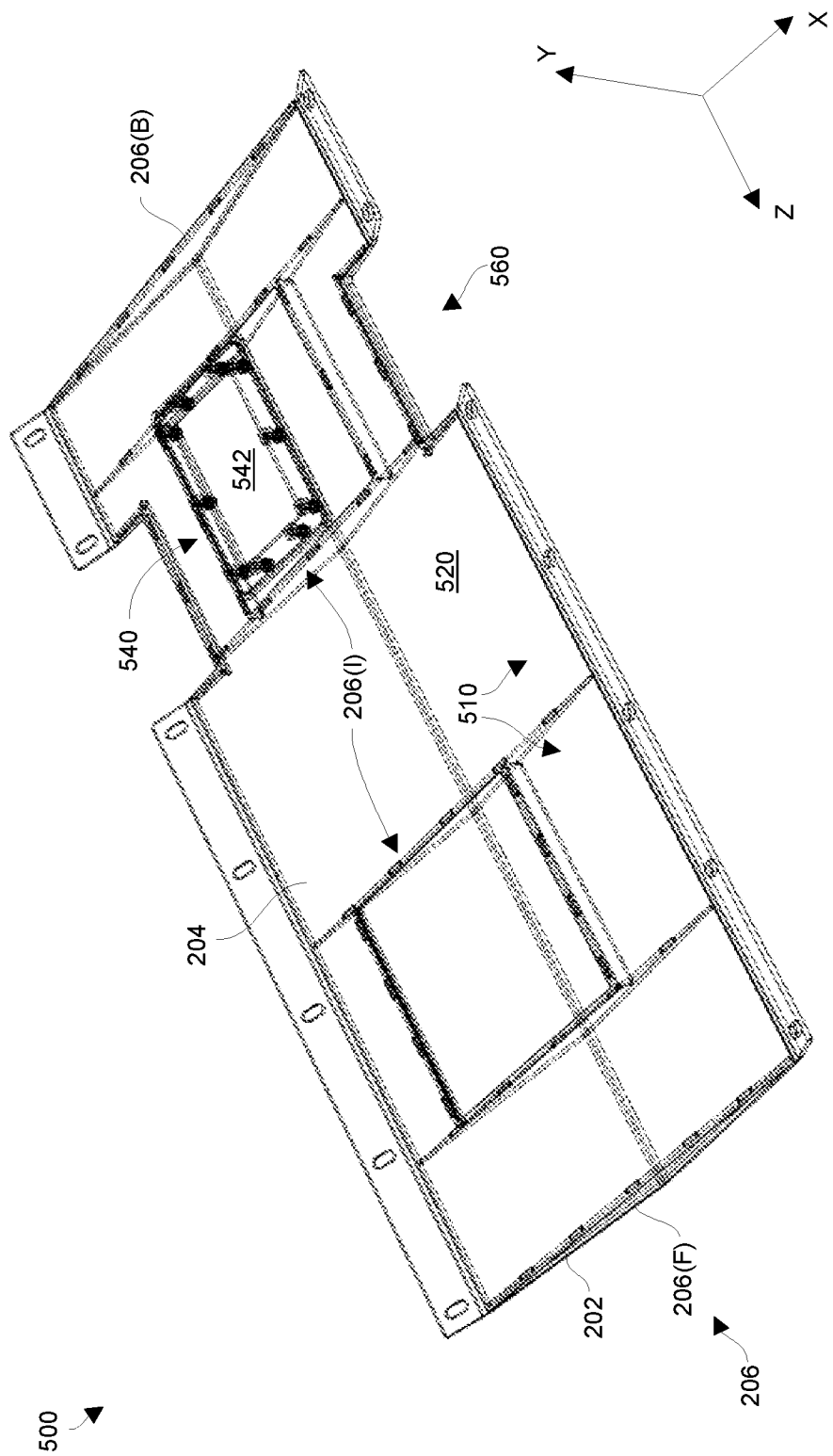
FIG. 5 is another perspective view showing, in phantom, a top plate in accordance with certain embodiments.
Figure 6:
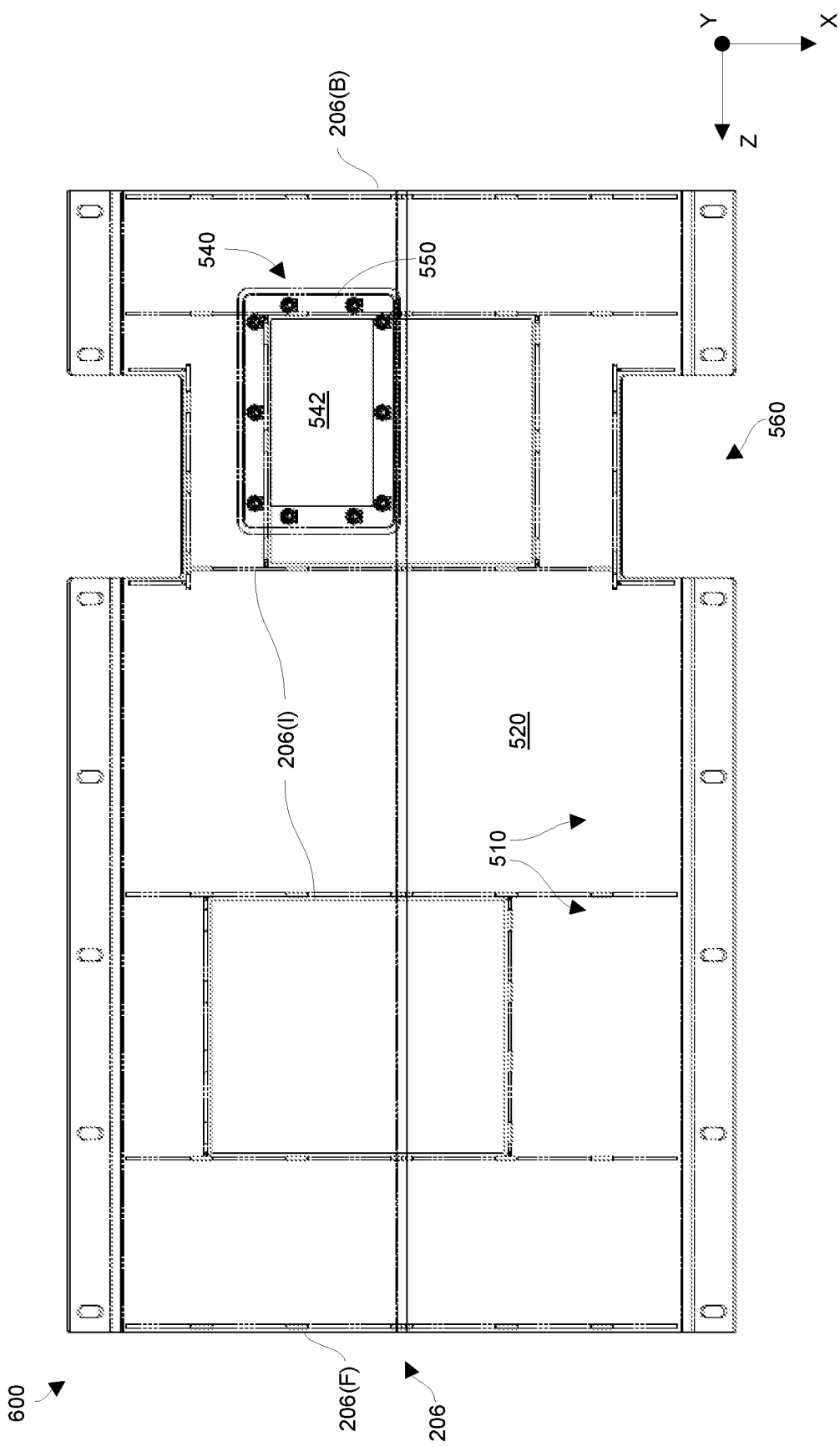
FIG. 6 is a top view showing, in phantom, a top plate in accordance with certain embodiments.

FIGS. 5 and 6 show further details of the modular vehicle belly armor kit 130 in accordance with certain embodiments. FIG. 5 is a perspective view 500 which is similar to the perspective view 200 of FIG. 2, except that the top plate 204 is shown in phantom. FIG. 6 is a top view 600 of the portion of modular vehicle belly armor kit 130 with the top plate 204 shown in phantom.

As shown in FIGS. 5 and 6, a set of interior wall sections 206(I) is disposed between the front wall section 206(F) and the back wall section 206(B). This set of interior wall sections 206(I) connects with the bottom plate 202 and the top plate 204 further improving rigidity of the bottom plate 202.

In some arrangements, the interior wall sections 206(I) interlock with the top plate 204 via respective sets of tabs and notches similar to those of the front and back wall sections 206(F), 206(B). For example, the interior wall sections 206(I) may be welded to the bottom plate 202 and interlock with the top plate 204.

In some arrangements, at least some of the interior wall sections 206(I) run parallel to the front and back wall sections 206(F), 206(B) (i.e., along the X-axis) to provide side-to-side strength (i.e., strength along the X-axis). In some arrangements, at least some of the interior wall sections 206(I) run perpendicular to the front and back wall sections 206(F), 206(B) (i.e., along the Z-axis) to provide front-to-back strength (i.e., strength along the Z-axis). In some arrangements, at least some of the interior wall sections 206(I) run parallel and others run perpendicular to provide strength in both directions.

As seen in FIGS. 5 and 6, the wall sections 206 in combination with the bottom plate 202 and the top plate 204 form a set of cavities (or internal spaces) 510. In accordance with certain embodiments, such cavities increase vehicle buoyancy. That is, when the modular vehicle belly armor kit 130 is installed on the vehicle body 110 (FIG. 1), the modular vehicle belly armor kit 130 improves the vehicle's ability to float. In some arrangements, the joints between at least some of the wall sections 206 and the bottom plate 202 and the top plate 204 are air tight. In some arrangements, at least some of the cavities 510 are filled with buoyant material 520 (e.g., foam, bladders holding gas, combinations thereof, etc.).

As further shown in FIGS. 2 through 6, the modular vehicle belly armor kit 130 may be provisioned with various access features. For example, in accordance with certain embodiments and as best seen in FIGS. 5 and 6, the bottom plate 202 of the modular vehicle belly armor kit 130 defines a set of access openings 540 (i.e., one or more access openings 540) covered by a respective set of cover plates 542. The set of access openings 540 may provide access to one or more systems or components of the vehicle 100 (e.g., an oil well, an axle, a differential, combinations thereof, etc.) without removing the modular vehicle belly armor kit 130. In some arrangements, welds between the bottom plate 202 and the wall sections 206 are provided by accessing the joint/weld locations via one or more of the access openings 540. As shown in FIGS. 5 and 6, various wall sections 206 may extend such access openings 540 through to the top plate 204 thus maintaining air tight sealing of the cavities 510 even when the set of cover plates 542 is removed and providing strength to the bottom plate 202.

Each cover plate 542 may mount over a respective access opening 540 via hardware (e.g., one or more bolts that engage one or more nuts welded to the bottom plate 202). In accordance with certain embodiments, the bottom plate 202 further defines a set of coamings (or raised borders/rings) 550 surrounding the set of access openings 540 to provide outer edges within which the set of cover plates 542 is able to expand in response to blast/explosive events. Such coamings 550 may further reduce the likelihood of hardware shearing due to collisions with debris in the operating environment 140 (e.g., by reducing the amount of hardware, by concealing a portion of the hardware, etc.).

As another access feature example, the modular vehicle belly armor kit 130 may define openings/gaps/recesses/etc. along its periphery to accommodate various structures and/or geometries of the other portions of the vehicle 100. Along these lines and in accordance with certain embodiments, the modular vehicle belly armor kit 130 is shown as including gaps 560 along the left and right outer edges to accommodate axle structures. Such gaps 560 may be provided via a combination of conforming surfaces in the bottom plate 202, the top plate 204, and/or the wall sections 206.

It should be appreciated that a main (or template) vehicle belly armor kit design may begin without any access features (e.g., access openings, gaps, flange angles, etc.). Then, for a particular use vehicle case, such access features may be introduced without compromising the primary features of the modular vehicle belly armor kit 130.

Figure 7:
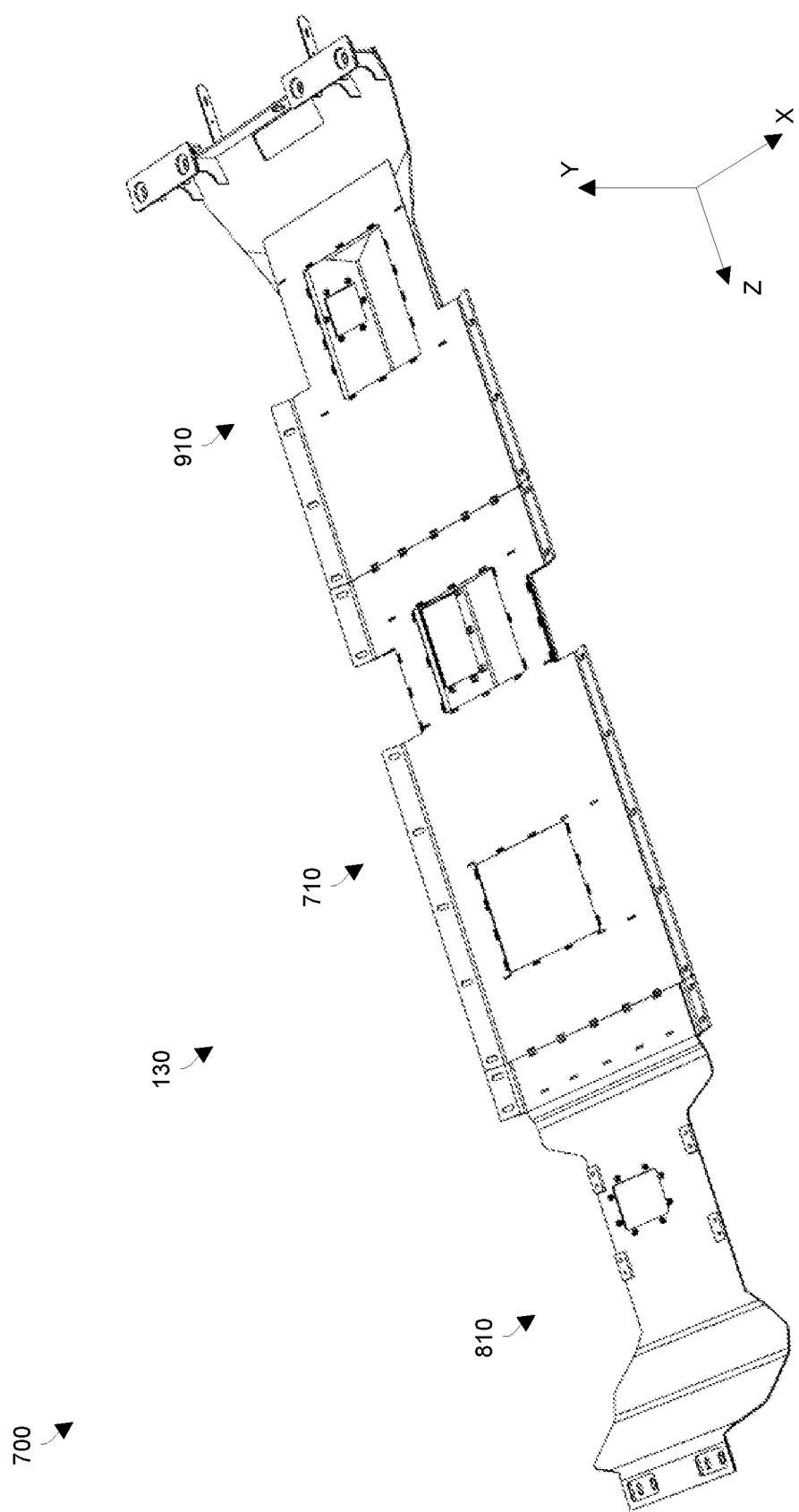
FIG. 7 is a perspective view of a modular vehicle belly armor kit for a longer vehicle in accordance with certain embodiments.
Figure 8:
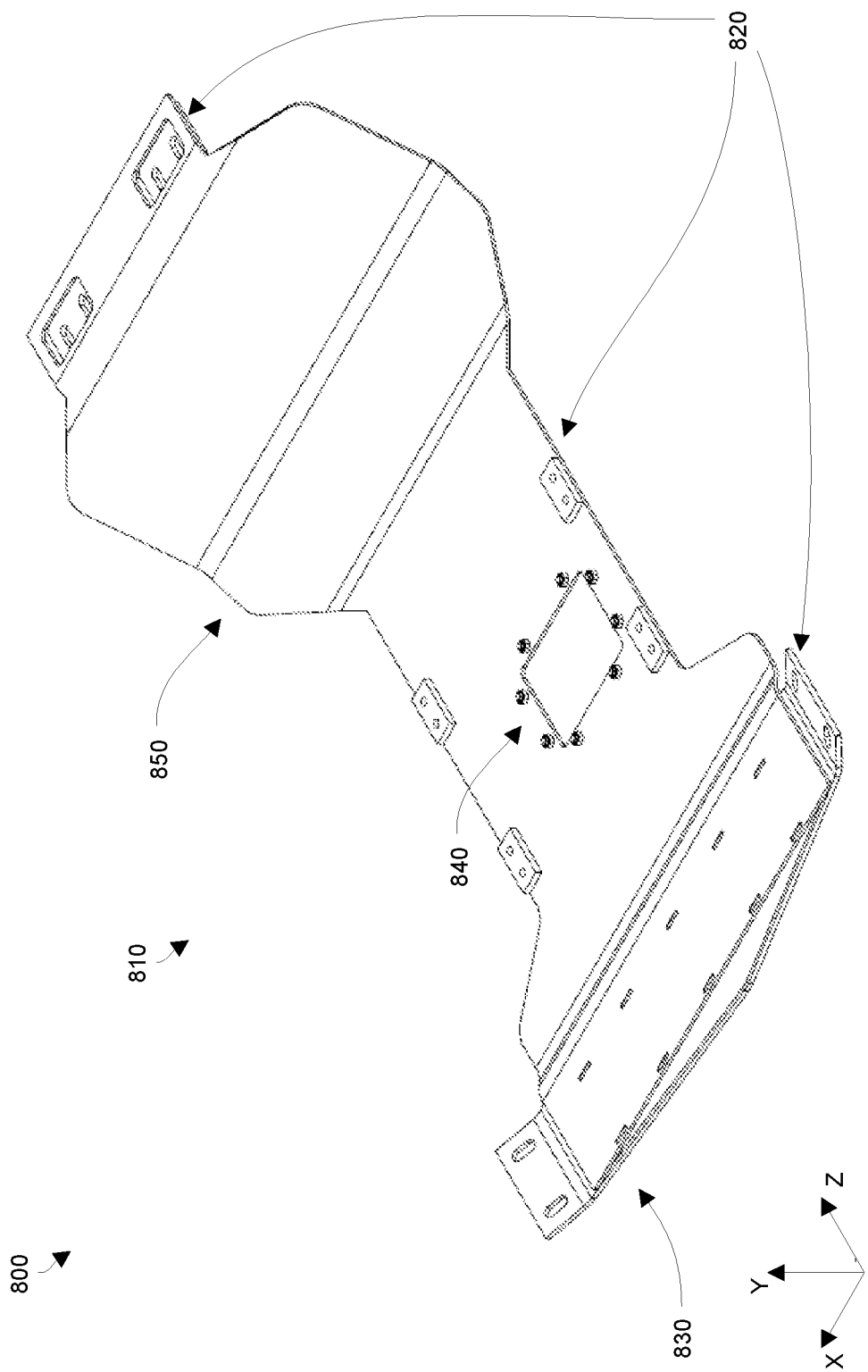
FIG. 8 is a perspective view of an example front portion of the modular vehicle belly armor kit of FIG. 7 in accordance with certain embodiments.
Figure 9:
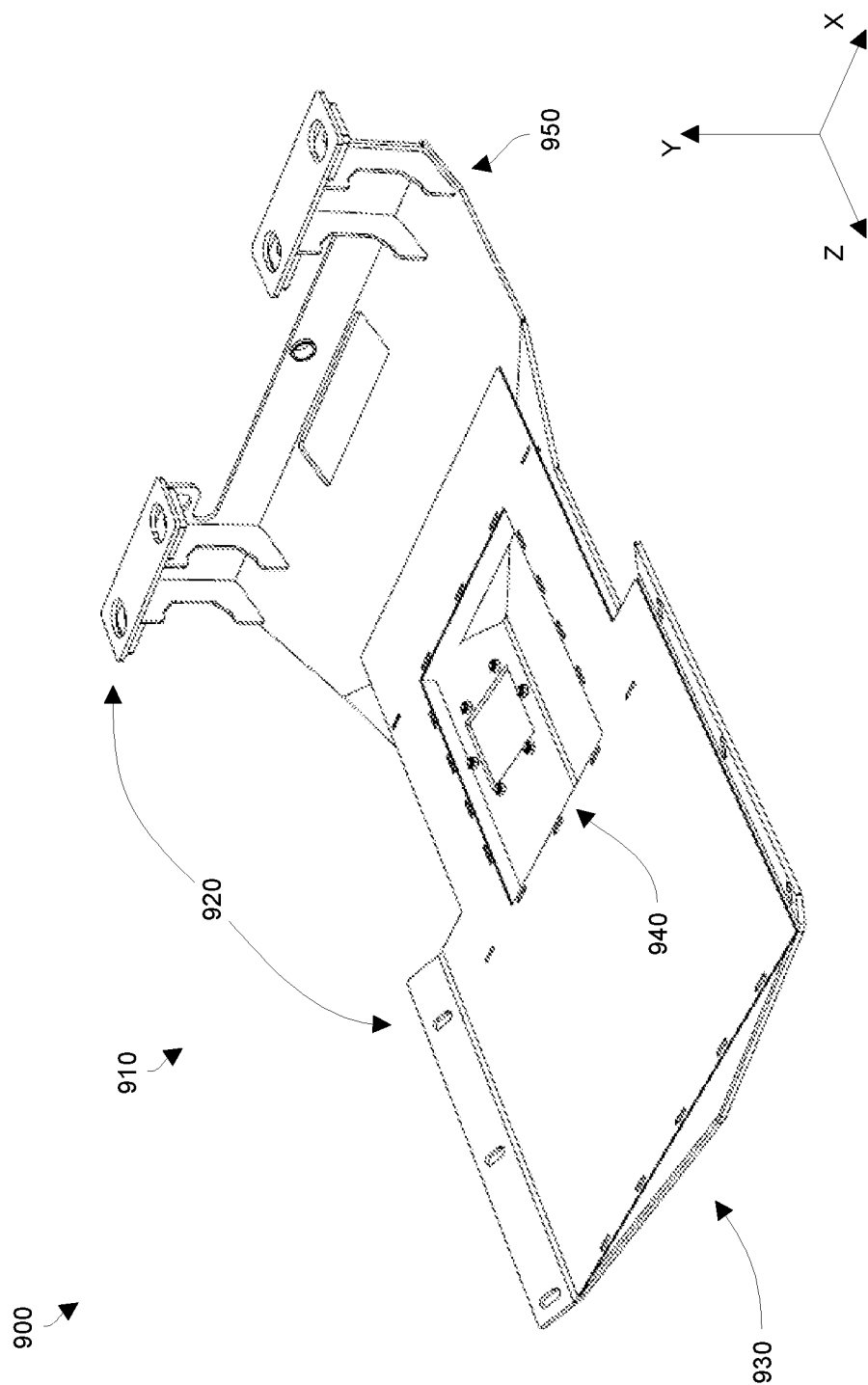
FIG. 9 is a perspective view of an example back portion of the modular vehicle belly armor kit of FIG. 7 in accordance with certain embodiments.

FIGS. 7 through 9 show additional details of the modular vehicle belly armor kit 130 in accordance with certain embodiments. FIG. 7 is a perspective view 700 of a portion 710 of the modular vehicle belly armor kit 130 further provisioned with example front and back armor portions 810, 910. FIG. 8 is a perspective view 800 of the example front armor portion 810. FIG. 9 is a perspective view 900 of the example back armor portion 910.

As shown in FIGS. 7 through 9, the portion 710 of the modular vehicle belly armor kit 130 may connect with the other armor portions 810, 910 via an interlocking mechanism similar to that used to interlock the top plate 204 with the wall sections 206. Such interlocking distributes the stresses involved in the connections between the portion 710 and the portions 810, 910 to form an elongated armor structure (i.e., a series of armor modules) that protects the underside of the vehicle 100 (also see FIG. 1). Such an arrangement is particularly well-suited for a longer vehicle 100. Additionally, such interlocking enhances the respective strengths of the portions 710, 810, 910 along their peripheries and enables at least some load transfer among and between the portions 710, 810, 910 during a blast/explosive event.

To achieve such interlocking, various areas of each portion 710, 810, 910 may provide notches, tabs, combinations thereof, etc. enabling the portion 710, 810, 910 to mesh together. In some arrangements, certain areas/components may connect via other means such as via welded joints, etc. for additional strength, stability, etc.

FIG. 8 shows certain details for the example front armor portion 810. As shown, the example front armor portion 810 includes features 820 for attaching to the vehicle body 110 (e.g., via hardware). Along these lines, one area 830 which is configured to engage with the portion 710 (also see FIG. 7) includes an arrangement of plates similar to that of the portion 710 (e.g., a top plate, a bottom plate, a wall section, etc.) to provide similar advantages as described earlier. Moreover, the bottom plate feature of the front armor portion 810 is shaped in the same manner as that of the portion 710 to mirror the operation of the portion 710. In some arrangements, at least a part of the front armor portion 810 adds buoyancy (e.g., by providing an air tight cavity, by including buoyant material, combinations thereof, etc.).

As also shown in FIG. 8, the example front armor portion 810 includes other features. As one example feature 840, the front armor portion 810 provides for an access opening and cover plate to enable access to underneath the vehicle 100 without removing the front armor portion 810. As another example feature 850, the front armor portion 810 provides bends and sections for protecting a front (or front side) of the vehicle body 110. Other features are suitable as well.

FIG. 9 shows certain details for the example back armor portion 910. As shown, the example back armor portion 910 includes features 920 for attaching to the vehicle body 110

(e.g., via hardware). Along these lines, one area 930 which is configured to engage with the portion 710 (also see FIG. 7) includes an arrangement of plates similar to that of the portion 710 (e.g., a top plate, a bottom plate, a wall section, etc.) to provide similar advantages as described earlier. Moreover, the bottom plate feature of the front armor portion 810 is shaped in the same manner as that of the portion 710 to mirror the operation of the portion 710. In some arrangements, at least a part of the back armor portion 910 adds buoyancy (e.g., by providing an air tight cavity, by including buoyant material, combinations thereof, etc.).

As further shown in FIG. 9, the example back armor portion 910 includes other features. As one example feature 940, the back armor portion 910 provides for an access opening and cover plate to enable access to underneath the vehicle 100 without removing the front armor portion 810. In particular, the feature 940 accommodates certain geometries of the vehicle body 110 and/or vehicle propulsion system 120 such as a transmission, differential, etc.

As another example feature 950, the rear armor portion 810 provides bends and sections for protecting a rear (or rear side) of the vehicle body 110. Other features are suitable as well. Further details will now be provided with reference to FIG. 10.

Figure 10:
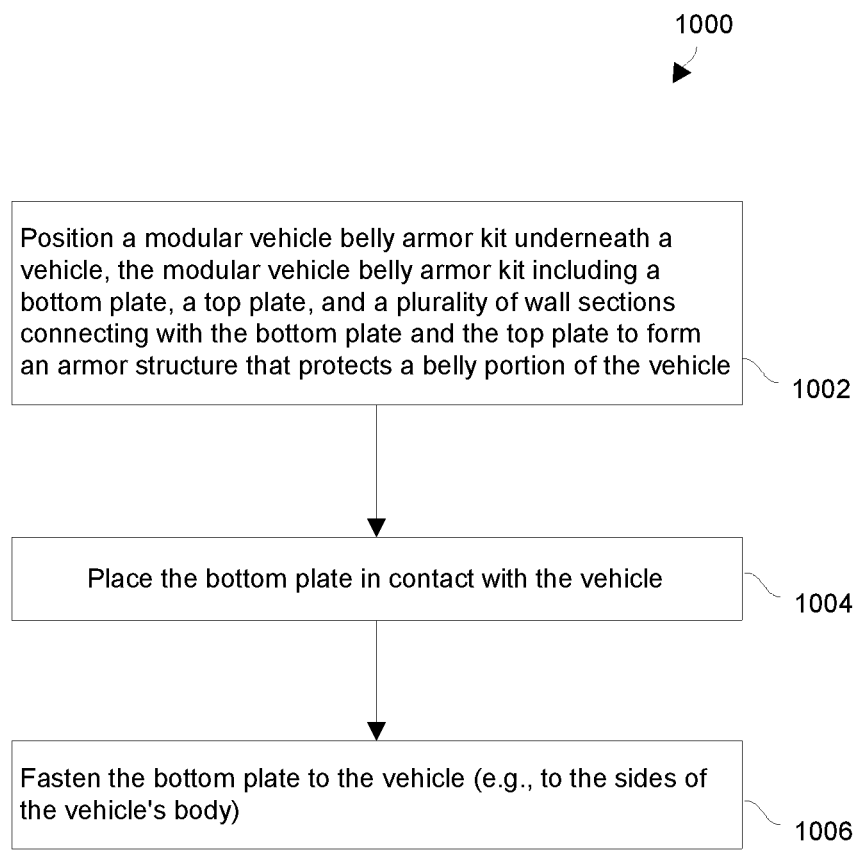
FIG. 10 is a flowchart of a procedure involving a modular vehicle belly armor kit which is performed in accordance with certain embodiments.

FIG. 10 is a flowchart of a procedure 1000 which uses a modular vehicle belly armor kit to protect a vehicle (e.g., also see FIG. 1). Such a procedure 1000 may be performed on a vehicle that is to be used in an environment in which the bottom side(s) of the vehicle may be targeted (e.g., in an unsafe militarized area).

At 1002, the modular vehicle belly armor kit is positioned underneath the vehicle. As mentioned earlier, the modular vehicle belly armor kit includes a bottom plate, a top plate, and a plurality of wall sections connecting with the bottom plate and the top plate to form an armor structure that protects a belly portion of the vehicle. Along these lines, while the vehicle resides in a service bay, the modular vehicle belly armor kit may be moved (e.g., slide on rollers) into an aligned position underneath the belly of the vehicle.

At 1004, after the modular vehicle belly armor kit is positioned underneath the vehicle, the bottom plate is placed in contact with the vehicle. In some arrangements, the bottom plate defines sections that flange out to sit flush against the sides of the vehicle's body. Here, the modular vehicle belly armor kit may be raised (e.g., using jacks) and/or the vehicle body may be lowered thus placing the kit and sides of the vehicle body into contact with each other.

At 1006, after the bottom plate is placed in contact with the vehicle, the bottom plate is fastened to the vehicle. In some arrangements, the sections of the kit that flange out define elongated apertures that enable hardware to attach the modular vehicle belly armor kit to the vehicle's body.

Once the modular vehicle belly armor kit is mounted to the vehicle, the vehicle is protected against blast and explosive events occurring underneath the vehicle. In some arrangements, the modular vehicle belly armor kit provides features (e.g., access openings, gaps, etc.) that enable various parts of the vehicle to be accessed while the modular vehicle belly armor kit remains installed on the vehicle. Furthermore, the modular vehicle belly armor kit may be removed/reinstalled to enable other vehicle servicing, vehicle repair, kit repair/replacement, and so on.

As described above, improved techniques are directed to making and/or using a modular armor kit 130 to protect the underbelly of a vehicle 100. Such a kit 130 includes a bottom plate 202, a top plate 204, and wall sections 206 that form an armor structure 210 that attaches to the vehicle body 110.

The bottom plate 202 may have a convex profile (e.g., a V-shaped cross-section) to enable the armor structure 210 to deflect projectiles out and away from the vehicle's centerline. In some arrangements, the armor structure 210 includes a set of cavities 510 (e.g., filled with air and/or lightweight material) to reduce dust/debris buildup as well as improve buoyancy thus making the vehicle 100 better suited for certain applications such as amphibious missions.

While various embodiments of the present disclosure have been particularly shown and described, it will be understood by those skilled in the art that various changes in form and details may be made therein without departing from the spirit and scope of the present disclosure as defined by the appended claims.

For example, it should be appreciated that particular portions of the modular armor kit 130 such as the bottom plate 202, the top plate 204, and the wall sections 206 may be formed of a thick and durable material such as steel. Such material enables the modular armor kit 130 effectively and efficiently protect the vehicle 100 from certain blast/explosive events targeting the vehicle's belly.

However, other materials are suitable for use in place of or in combination with steel. Such other materials includes sheets or webs of carbon fiber or filaments, Kevlar, nylon, rubber, foam, combinations thereof, and so on.

It should be appreciated that, in accordance with certain embodiments, a modular under vehicle belly armor kit is designed so that it may protect armored vehicles from explosive events that can be targeted at the bottom side of a vehicle. Such a kit utilizes a single formed V-shaped plate that creates a homogenous bottom face positioned in the direction of potential blast or explosive threats under a vehicle. This V-shaped plate utilizes an additional bend in the outer most segment of the plate with lateral slot voids to provide a means for mounting hardware to attach the kit to a vehicle. The slots in the mounting flange may allow for discrepancy in plate position during a production environment due to deformities and may increase protection performance by allowing movement in belly armor kit as opposed to a rigid hard mounted structure.

In some embodiments, the kit utilizes an internal truss rib support structure comprised of flat plates that interlock with a top plate. Such a structure provides added rigidity to the V-shaped plate that is designed so it may deflect the projectiles out and away from the vehicle centerline.

Additionally, this top plate may provide a flush surface for mounting to the bottom side of a vehicle, and provides a means to possibly seal the kit structure with the potential intent of creating buoyancy below an amphibious vehicle, possibly reducing drag in a swimming environment, or reducing cavities wherein debris and dust may build up adding to the overall weight of a vehicle.

Furthermore, the mounting structure allows for small modifications to an outer flange angle that will enable various vehicle under belly shapes to utilize the kit that may not compromise the performance of the kit for these events. In the case of longer vehicle lengths, multiple segments of this kit can be installed on a vehicle so that it may provide the desired protection without creating a protection structure that can cause installation problems due to overall weight or size. In the case of a vehicle subsystem located in a position that would be more difficult to access when this kit is installed versus when it is not, an access cover can be added to the V-shaped plate to provide easy access for things such as maintenance for subsystems like changing the oil from an axle differential of a vehicle. This access cover may comprise of mounting onto the V-shaped plate with voids for bolting hardware added to the two plates. A tapped flange, or other tapped part such as but not limited to weld nuts or tapping pads, may be added to the interior side of the V-shaped plate to provide a fixture for hardware to secure the added cover plate. A coaming or ring surrounding the added cover plate can be included so that it may provide an outer edge for the cover to expand against in the event of a blast or explosion under a vehicle. This coaming may also reduce the possibility of hardware shearing due to collisions with debris from vehicle operating environments.

Some conventional designs might intend to shape the bottom side of the vehicle hull to deliver this performance instead of relying on a bolt-on provision for the main protection system. Some existing add-on armor solutions are designed to utilize a form of dampening either through energy absorbing components such as dampers or porous materials designed to reduce momentum or through explosive countermeasures designed to negate the incoming force.

In accordance with certain embodiments, the modular under vehicle belly armor kit is an external bolt-on structure for a vehicle that may provide additional under vehicle blast and explosive protection that can be easily adapted to various vehicle bottom profiles and various lengths due to a modular base design. Such a design is well-suited for military and protection-based industries such as protection of very high level executives. Such modifications and enhancements are intended to belong to various embodiments of the disclosure.

What is claimed is:

1. A modular vehicle belly armor kit, comprising:
a bottom plate;
a top plate; and
a plurality of wall sections connecting with the bottom plate and the top plate to form an armor structure that protects a vehicle belly of a vehicle;
wherein the bottom plate defines a set of access openings; and
wherein the modular vehicle belly armor kit further comprises:
a set of cover plates that covers the set of accessing openings defined by the bottom plate.

2. A modular vehicle belly armor kit as in claim 1 wherein the bottom plate further defines a set of bends that provides the armor structure with a convex shape;
wherein the top plate defines a plane, a left edge, and a right edge; and
wherein the left edge and right edge defined by the top plate connect with the bottom plate.

3. A modular vehicle belly armor kit as in claim 2 wherein the set of bends defined by the bottom plate includes a centerline bend that provides the bottom plate with a V-shaped cross-section.

4. A modular vehicle belly armor kit as in claim 3 wherein the set of bends defined by the bottom plate further includes outer bends that separate the bottom plate into a central section and outermost sections.

5. A modular vehicle belly armor kit as in claim 4 wherein the centerline bend and the outer bends are parallel to each other.

6. A modular vehicle belly armor kit as in claim 4 wherein the outer bends include a left outer bend and a right outer bend;
wherein the left edge defined by the top plate attaches to the bottom plate adjacent the left outer bend; and
wherein the right edge defined by the top plate attaches to the bottom plate adjacent the right outer bend.

7. A modular vehicle belly armor kit as in claim 4 wherein the outermost sections include:
a left outer segment constructed and arranged to mount to a left side of the vehicle; and
a right outer segment constructed and arranged to mount to a right side of the vehicle.

8. A modular vehicle belly armor kit as in claim 7 wherein the left outer segment and the right outer segment extend upwardly relative to the plane defined by the top plate to position the plane defined by the top plate horizontally when the left outer segment is mounted to the left side of the vehicle and the right outer segment is mounted to the right side of the vehicle.

9. A modular vehicle belly armor kit as in claim 7 wherein the left outer segment defines a left row of elongated apertures and the right outer segment defines a right row of elongated apertures to enable movement between the vehicle and the modular vehicle belly armor kit.

10. A modular vehicle belly armor kit as in claim 2 wherein the top plate further defines a front edge and a back edge; and
wherein the plurality of wall sections includes:
a front wall section that connects with the bottom plate and the front edge defined by the top plate, and
a back wall section that connects with the bottom plate and the back edge defined by the top plate.

11. A modular vehicle belly armor kit as in claim 10 wherein the plurality of wall sections further includes:
a set of interior wall sections that connects with the bottom plate and the top plate, the set of interior wall sections being disposed between the front wall section and the back wall section.

12. A modular vehicle belly armor kit as in claim 11 wherein the top plate further defines a plurality of notches; and
wherein each wall section of the plurality of wall sections defines a respective set of tabs that interlocks with a respective set of notches of the plurality of notches defined by the top plate.

13. A modular vehicle belly armor kit as in claim 11 wherein the front wall section, the back wall section, and the set of interior wall sections form a set of internal cavities to provide buoyancy to the vehicle.

14. A modular vehicle belly armor kit as in claim 13, further comprising:
foam material disposed within at least some of the set of internal cavities.

15. A modular vehicle belly armor kit as in claim 1 wherein the bottom plate further defines a set of coamings surrounding the set of access openings; and
wherein the set of cover plates is constructed and arranged to attach within the set of coamings defined by the bottom plate.

16. A vehicle, comprising:
a vehicle body;
a propulsion system coupled with the vehicle body, the propulsion system being constructed and arranged to move the vehicle body within an environment; and
a modular vehicle belly armor kit constructed and arranged to fasten to the vehicle body, the modular vehicle belly armor kit including:
a bottom plate,
a top plate, and
a plurality of wall sections connecting with the bottom plate and the top plate to form an armor structure that protects a belly portion of the vehicle;

wherein the bottom plate of the modular vehicle belly armor kit defines a set of access openings; and wherein the modular vehicle belly armor kit further includes:

a set of cover plates that covers the set of accessing openings defined by the bottom plate.

17. A vehicle as in claim 16 wherein the vehicle body is constructed and arranged to travel amphibiously on water and land; and wherein the armor structure is constructed and arranged to provide buoyancy to the vehicle body.

18. A method of protecting a vehicle, the method comprising:

positioning a modular vehicle belly armor kit underneath a vehicle, the modular vehicle belly armor kit including:

a bottom plate, a top plate, and a plurality of wall sections connecting with the bottom plate and the top plate to form an armor structure that protects a belly portion of the vehicle;

after the modular vehicle belly armor kit is positioned underneath the vehicle, placing the bottom plate in contact with the vehicle; and after the bottom plate is placed in contact with the vehicle, fastening the bottom plate to the vehicle;

wherein the bottom plate of the modular vehicle belly armor kit defines a set of access openings; and wherein the modular vehicle belly armor kit further includes:

a set of cover plates that covers the set of accessing openings defined by the bottom plate.

19. A modular vehicle belly armor kit, comprising:

a bottom plate;

a top plate; and a plurality of wall sections connecting with the bottom plate and the top plate to form an armor structure that protects a vehicle belly of a vehicle;

wherein the plurality of wall sections includes a front wall section, a back wall section, and a set of interior wall sections; and wherein the front wall section, the back wall section, and the set of interior wall sections form a set of internal cavities to provide buoyancy to the vehicle.

20. A modular vehicle belly armor kit as in claim 19 wherein the bottom plate defines a set of bends that provides the armor structure with a convex shape;

wherein the top plate defines a plane, a left edge, and a right edge; and wherein the left edge and right edge defined by the top plate connect with the bottom plate;

wherein the top plate further defines a front edge and a back edge;

wherein the front wall section connects with the bottom plate and the front edge defined by the top plate, and the back wall section connects with the bottom plate and the back edge defined by the top plate; and wherein the set of interior wall sections connects with the bottom plate and the top plate, the set of interior wall sections being disposed between the front wall section and the back wall section.

* * * * *